United States Patent [19]
Gray

[11] Patent Number: 6,026,694
[45] Date of Patent: Feb. 22, 2000

[54] LINEAR FORCE SENSING DEVICE

[75] Inventor: J. Glenn Gray, Douglas Flat, Calif.

[73] Assignee: Serena Industries Incorporated, Sunnyvale, Calif.

[21] Appl. No.: 09/052,338

[22] Filed: Mar. 30, 1998

[51] Int. Cl.[7] .......................................................... G01L 1/16
[52] U.S. Cl. .......................................................... 73/862.68
[58] Field of Search ........................... 73/862.52–862.69; 361/283.1; 177/110 C

[56] References Cited

U.S. PATENT DOCUMENTS

| | | | |
|---|---|---|---|
| 4,370,697 | 1/1983 | Haberl . | |
| 4,585,082 | 4/1986 | Harrington . | |
| 4,913,248 | 4/1990 | Zakai | 177/210 |
| 4,951,764 | 8/1990 | Brand | 177/210 C |
| 5,315,883 | 5/1994 | Wirth | 73/862.59 |
| 5,321,209 | 6/1994 | Liebermann et al. | 73/862.625 |
| 5,379,653 | 1/1995 | Saner | 73/862.59 |
| 5,400,661 | 3/1995 | Cook et al. | 73/862.043 |
| 5,693,886 | 12/1997 | Seimiya . | |
| 5,900,592 | 5/1999 | Sohns et al. | 117/210 R |

Primary Examiner—Benjamin R. Fuller
Assistant Examiner—Jewel V. Thompson
Attorney, Agent, or Firm—Presseisen & Reidelbach, P.C.; Charles F. Reidelbach, Jr.

[57] ABSTRACT

The force sensing device of the present invention provides an elastomeric spacer coupled between a base member and platform structure. The characteristics of the spacer material allow the spacer to be linearly deformable upon application of force, and this deformation region is known as the linear travel distance of the spacer. The remaining region has substantially no additional deformation with respect to force applied, and is known as the non-deformable distance of the spacer. A sensing mechanism built directly into the device provides a means for sensing the linear travel distance upon various applications of force. More specifically, the sensory mechanism includes a movable and fixed portion respectively, separated by a distance equal to the aforementioned linear travel distance. The sensing mechanism can be of a type that detects electro-magnetic, electro-optical or any other electrical property or event, but is preferably a variable capacitor having a first and second electrode as the movable and fixed portions. Finally, an electrical circuit may be connected to the sensing mechanism to measure the change in electrical signal in direct response to the changed distance between the movable and fixed portions.

20 Claims, 3 Drawing Sheets

LINEAR FORCE SENSING DEVICE

FIELD OF THE INVENTION

The present invention pertains generally to a force sensing device which senses and provides a measurement of either force or weight. More specifically, the force sensing device of the present invention provides a unique device structure which utilizes a substantially linear deformable material to directly linearize the relationship between applied force and output measurement signal. Additionally, the structure of the present invention provides a measurement signal having significantly greater sensitivity and accuracy.

BACKGROUND OF THE INVENTION

Existing force sensing devices based upon load cell technology usually utilize one of two designs. The first is a strain gauge adhering to an elastic spacer that produces changes in electrical resistance based upon a change in force or weight applied. The second is an elastic mat-type, wherein the elastomer is a sheet of plastic and acts as both a capacitor dielectric and as a deformable spring between the electrodes to which it adheres. This mat-type force sensing device typically measures a change in capacitance between the electrodes as force is applied to the device and the distance between the electrodes decreases accordingly.

Ideally, the relationship between force and the change in elastomeric material deformation is linear over a workable range of the elastic mat. Unfortunately, this relationship is often one of non-linearity because of the nonlinear characteristics of elastomeric material used and/or the elastomeric mat is in someway constrained during deformation. This is usually a result of elastomer form factor such as shape and density, space limitations for transverse elongation of the elastomer during deformation, and/or method and degree of securing the elastomeric spacer to the hardware.

Force measurements of mat-type force sensing devices also suffer from low sensitivity and low resolution because the smaller dielectric constant of the elastomer is used, rather than the larger dielectric constant of air. Sensitivity and resolution of the capacitance signal is also attenuated by the non-usable or non-deformable distance which separates the two electrodes of the variable capacitor.

Previous developers have used multiple elastomeric strips or multiple complex perforations through the elastomeric matrix to improve its direct linear response. These developers met with varying degrees of success and always an increase in manufacturing difficulty and cost.

As stated above, mat-type force or weight sensing devices were also limited in sensitivity and resolution by the limited usable travel distance of the elastomer as force was applied to deform the elastomer, and by the larger non-deformable distance that attenuates the measurement or capacitance signal. This deformable distance is only about twenty to thirty percent of the entire dimension of the elastomer, and is usually referred to as the linear travel distance. Any force or weight that deforms the elastomer beyond this twenty to thirty percent limit will cause the elastomer to physically breakdown resulting in an irreversible failure of the force sensing device.

Accordingly, there is a need in the marketplace for a force sensing device that has a physical structure which directly linearizes the relationship between applied force and measurement signal, and that provides greater sensitivity and higher resolution of those measurements. There is also demand for a device that is structurally designed so that physical breakdown of the elastomeric spacer upon an overload of force is mechanically prevented. Finally, there is a need for this device to be mechanically simple, easy to assemble and inexpensive to manufacture.

SUMMARY OF THE INVENTION

It is therefore the primary object of the present invention to provide a force sensing device having a physical structure configured to directly linearize the relationship between applied force and the resulting measured output without the need for sophisticated calibration circuitry or mechanical complexity.

It is also an object of the present invention to provide a force sensing device having greater measurement sensitivity and resolution.

It is also an object of the present invention to provide a force sensing device which mechanically prevents and electrically detects the physical breakdown of the elastomeric spacer.

It is also an object of the present invention to provide a force sensing device which fully utilizes the linear deformation properties of an elastomer.

It is also an object of the present invention to provide a force sensing device having the foregoing capabilities, yet which is rugged, inexpensive and easy to manufacture.

These and other objects are achieved in accordance with the present invention by providing a fixed base member mechanically coupled to a movable platform structure. More specifically, a perforated elastomeric spacer is positioned between the base member and platform structure. A connecting rod may be extended through the perforation for securing the spacer between the base member and platform structure.

The elastomeric spacer of the present invention has a region which is linearly deformed upon a force being applied to the platform structure. The characteristics of the spacer material are such that it has a spring constant which is substantially linear with respect to the amount of force applied over its deformable region. This region is defined as the linear travel distance of the spacer, and is typically between twenty to thirty percent of the original distance or dimension of the spacer.

A property of the elastomeric spacer is that it has a spring constant which is exceedingly large when force is overloaded and deformation is beyond approximately thirty percent of the original distance of the spacer. Accordingly, forces applied that go beyond those forces, result in substantially no additional deformation. This region is defined as the non-deformable distance of the spacer.

A sensing mechanism is provided for sensing the amount of movement or travel distance upon the application of a force or weight. More specifically, the sensing mechanism has a movable portion affixed to the platform structure and a fixed portion affixed to the base member. The structure is such that the maximum distance of separation between the movable portion and the fixed portion of the sensing mechanism is equal to the expected or linear travel distance of the spacer. This is accomplished by providing a cavity in either the platform structure or base member for receiving a portion of the spacer equal to the non-deformable distance.

The sensing mechanism can be of a type that detects electromagnetic, electro-optical or any other electrical property or event, such as capacitance. For example, the present invention contemplates the sensing mechanism as a variable capacitor having first and second electrodes as the fixed and movable portions. The capacitor is configured to provide a change of capacitance upon movement of the platform structure relative to the base member.

An electrical circuit may be connected to the sensing mechanism to measure the change in electrical signal in response to the changed distance of the movable portion and the fixed portion. For instance, as mentioned above, the electrical circuit may be connected to the variable capacitor to provide an electrical output in response to the changed capacitance.

The electrical circuit may be a typical oscillator circuit which can be any configuration that uses variable capacitance to cause a frequency change (KHz) such that the frequency change is inversely proportional to the capacitance change.

Further detail regarding the construction of a force sensing device in accordance with the present invention may be had with reference to the detailed description which is provided below, taken in conjunction with the following illustrations.

DETAILED DESCRIPTION OF THE PREFERRED EMBODIMENT

Figure 1:
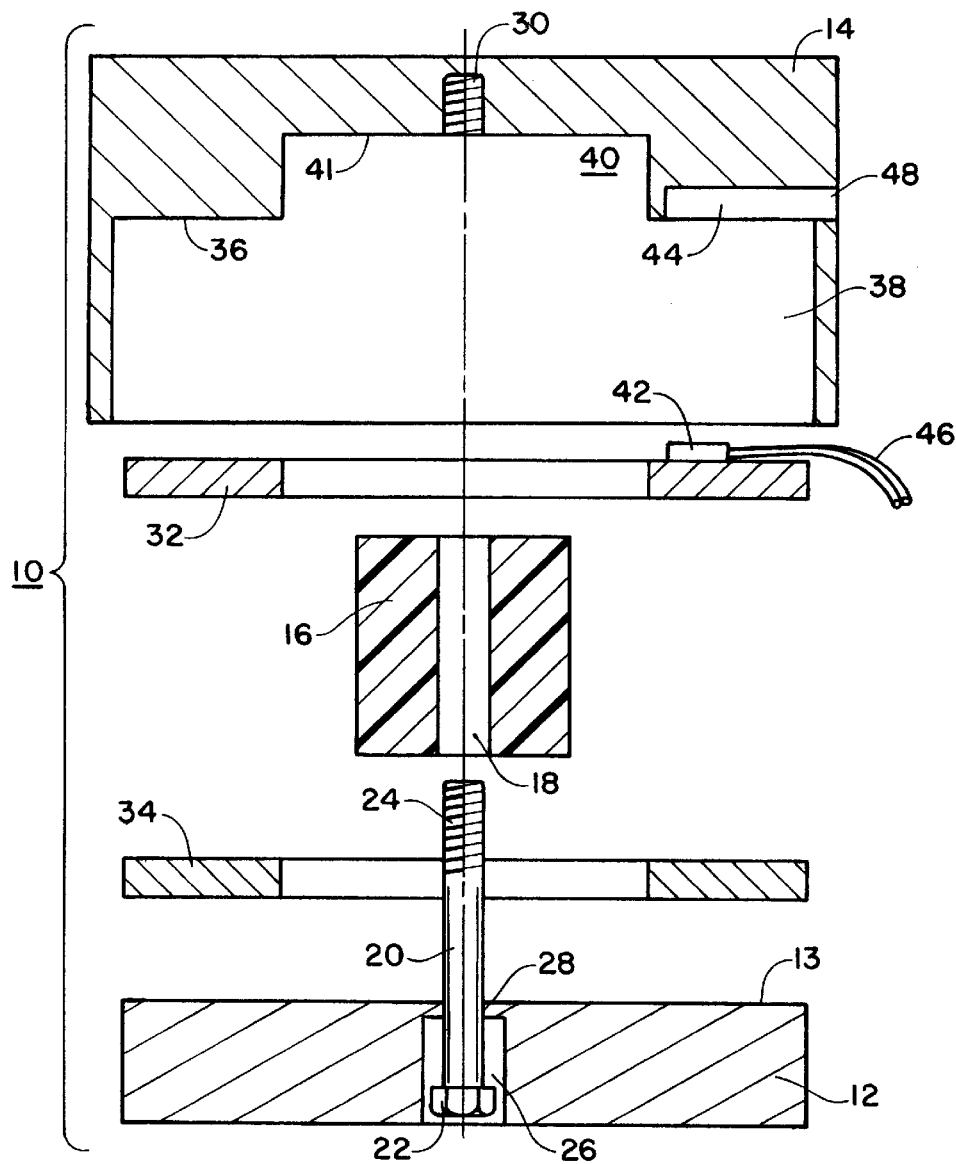
FIG. 1 is a cross-sectional side view of the present invention with the components shown in an exploded view.

Initially referring to FIG. 1, a force sensing device 10 of the present invention includes a fixed base member 12 and a movable platform structure 14. The base member 12 and platform structure 14 are mechanically coupled together by way of an elastomeric spacer 16 positioned therebetween. The spacer 16 has a lumen 18 extending throughout the longitudinal center of the spacer 16. A connecting rod 20 extends through the lumen 18 to slidably couple the base member 12 with the platform structure 14.

The connecting rod 20 has an adjustment head 22, and a distal threaded end 24. The threaded end 24 passes through a recess 26 and perforation 28 centered on the base member 12. The threaded end 24 then passes through the lumen 18 of the spacer 16 and engages a threaded receptacle 30 of the platform structure 14. The adjustment head 22 of the connecting rod 20 fits inside the recess 26 of the base member 12, and is constrained by the more narrow perforation 28. The length of the recess 26 is sufficient to allow the adjustment head 22 to move the same distance that the spacer 16 deforms during force application. Turning adjustment head 22 will adjust the distance between the base member 12 and the platform structure 14. This will allow pre-loading of the elastomeric spacer 16 for better isolation of the linear deforming portions of the spacer 16.

It is to be understood that rather than using connecting rod 20 through the lumen 18 to secure the spacer 16 to the platform structure 14 and base member 12, other means such as glue, hot melt, adhesives, form fit, staples, screws, rivets, or other securing means well known to those skilled in the art, may be used.

Further inspection of FIG. 1 reveals a movable sensing element 32 and a fixed sensing element 34. The resulting sensor mechanism detects the changing proximity of the two sensing elements 32, 34 as force is applied. The movable sensing element 32 is affixed to the inside edge 36 contained in the recess 38 of the platform structure 14. The fixed sensing element 34 is attached to the base member 12 in similar manner, and is juxtaposed to the movable sensing element 32. The center bore of these two sensing elements 32, 34 allow the spacer 16 to pass through and reside in the oversized cavity 40 of the platform structure 14. When fully assembled and operational, as shown in FIG. 2, both sensing elements 32, 34, the base member 12, and portions of the spacer 16 are encased inside the recess 38 of the platform structure 14.

Still further inspection of FIG. 1 illustrates the electronic circuitry 42 that converts the measured linear signal resulting from the two sensing elements 32, 34. This electronic circuitry 42 fits into the recess 44 built into the platform structure 14. The electrical wiring 46 connected to the circuitry 42 exits from the device 10 through a wiring exit 48.

Figure 2:
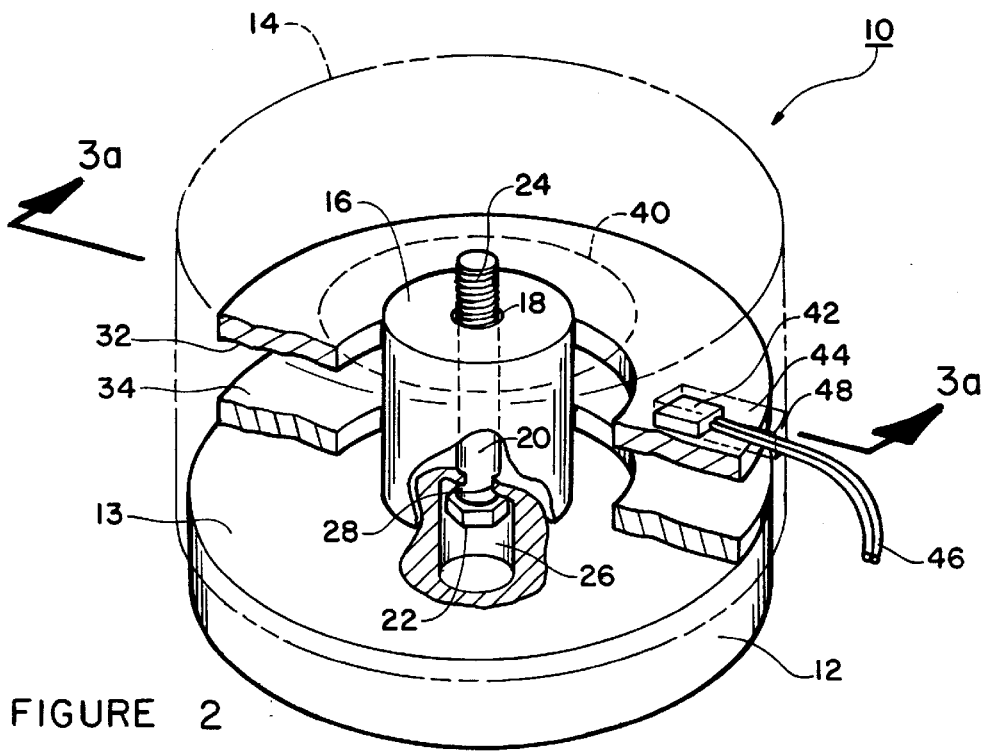
FIG. 2 is a perspective view of the present invention with the components shown assembled into a working device.

Referring now to FIG. 2, the spacer 16 has the form of a thick-walled tube. In the preferred embodiment, the spacer 16 has nominal dimensions of 0.5 inches in height, 0.6 inches in outer diameter, and 0.2 inches in inner diameter. This particular spacer 16 can be obtained as a "Urethane Compressing Spring," part number U0188050 from Century Spring, E. 161$^{th}$ St., Los Angeles, Calif. It is known to those skilled in the art that other tubes, solid cylinders, solid and perforated cubes, solid and perforated spheres, and other solid and perforated three dimensional shapes similarly proportioned to spacer 16 are enabling as long as the thick-wall form factor is retained.

It is also apparent from FIG. 2 that both sensing elements 32, 34 are washer-shaped. The central bore of each washer-shaped sensing element 32, 34 allows the spacer 16 to clearly pass through without lateral contact, thereby allowing the spacer 16 to directly connect with the platform structure 14 and base member 12. The connecting rod 20 is clearly shown securing and aligning the spacer 16 between the platform structure 14 and base member 12. The location of the electronic circuitry 42 and electrical wiring 46 is also clearly contained within the limited recess 44 as shown.

Figure 3A:
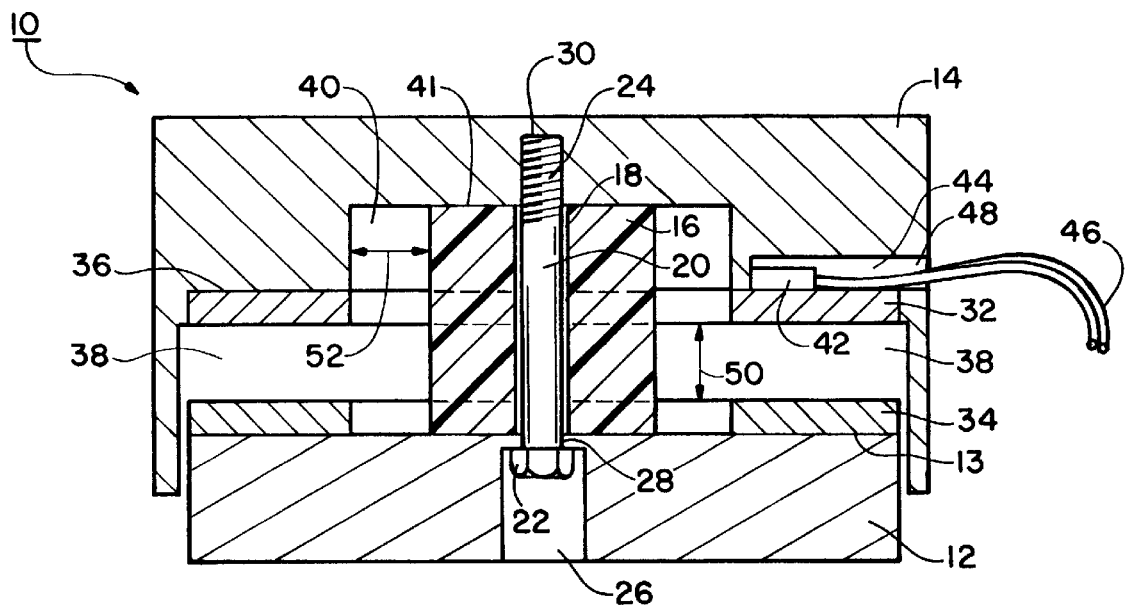
FIG. 3a is a cross-sectional side view of the present invention shown assembled, prior to application of force upon the platform structure.

Referring now primarily to FIG. 3a, the present invention is shown assembled, and without any loading of force upon the platform structure 14. The movable sensing element 32 is clearly affixed to the inside edge 36 of the recess 38 of the platform structure 14. The fixed sensing element 34 is affixed to the inside surface 13 of the base member 12. These sensing elements 32, 34 are affixed by either glue, hot melt, adhesive insulating strips, snap fit, staples, screws, rivets, or by other non-conductive means well known to those skilled in the art.

The elastomeric spacer 16 is clearly shown in direct contact with both the inside edge 41 of the oversized cavity 40 contained in the platform structure 14, and the inside surface 13 of the base member 12. This direct contact results in the spacer 16 bearing the entire load when force begins to be applied to the platform structure 14. The connecting rod 20 assists in maintaining this direct contact. The connecting rod 20 will move with the platform structure 14 when force is applied, thereby allowing only the platform structure 14 to load force upon the spacer 16. During force application, the connecting rod 20 does not transmit load to the spacer 16, because the rod 20 slides through both the lumen 18 of the spacer 16, and the perforation 28 and recess 26 of the base member 12.

The elastomeric spacer 16 has two regions which are important for the operation of this invention. These regions are characterized by their different response to applied force, which results in deformation or non-deformation of the spacer 16.

Each region has an characteristic "spring" constant defined as force or weight applied divided by the distance deformed. The first constant is substantially linear over the deformable region, in that incremental increases in force or weight result in equivalent increases in distance deformed. The second constant is substantially non-linear over the non-deformable region, in that incremental increases in force or weight result in little, if any, decrease in deformation distance. This non-deformable region appears after the linear deformable region of the spacer 16 has been entirely utilized. This results in a "spring" constant for the non-deformable region that is exceedingly large.

The deformable region of the spacer 16 is characterized by its linear "spring" constant, and results in a linear travel distance 50 for the spacer 16. This distance is approximately twenty to thirty percent of the original length of the spacer 16. The non-deformable region of the spacer 16 is characterized by its exceedingly large "spring" constant, and results in a non-deformable distance 58 of the spacer 16, which is approximately seventy to eighty percent of the original length.

The linear travel distance 50 of the spacer 16 is exploited in the present invention, because the movable sensing element 32 and the fixed sensing element 34 are precisely this linear distance 50 apart. What remains of the travel distance of the spacer 16 is substantially contained in the oversized cavity 40 of the platform structure 14, thereby making it impossible for the sensing elements 32, 34 to utilize the non-deformable region of the spacer 16. It will be obvious to those skilled in the art that the oversized cavity 40 could be located in the base member 12, rather than the platform structure 14, and still achieve an identical result.

This placement of the sensing elements 32, 34 results in linear changes in signal as force is applied, which is then transmitted to the electrical circuit 42. This circuit 42 does not have to compensate for the non-linearity of the signal, because the signal originates as linear from the two sensing elements 32, 34. This signal is then made available for external use, by the electrical wiring 46 that connects to the electrical circuit 42.

Figure 3B:
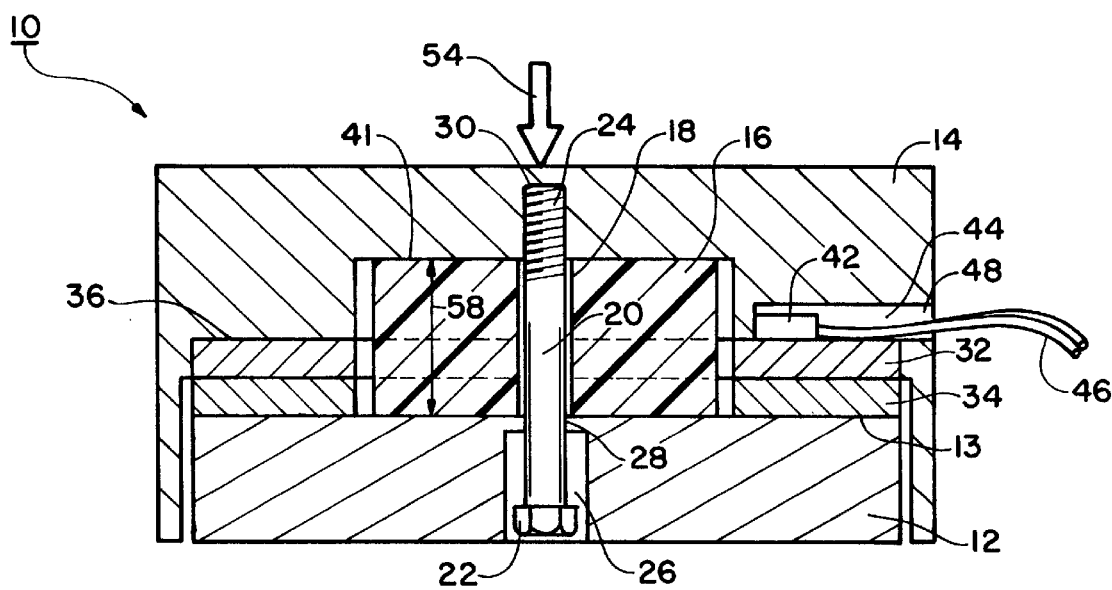
FIG. 3b is an cross-sectional side view of the present invention shown assembled, during application of an overloading force to the platform structure.

Referring now primarily to FIG. 3b, the present invention is shown assembled, and overloaded by the application of force 54 or weight upon the platform structure 14. An overload condition results as when force 54 or weight applied exceeds the maximum limits for linear deformation of spacer 16. Consequently, the spacer 16 transversely elongates to its maximum limit in the oversized cavity 40 and takes up much, but not all of the available elongation recess 52. The transverse elongation of the spacer 16 is not physically constrained because the dimensions of the oversized cavity 40 is calculated to contain it. This lack of physical constraint to the transverse elongation of the load-bearing spacer 16 improves the linear relationship between force 54 and distance deformed 50, or signal produced.

As stated earlier, the sensing elements 32, 34 are spaced apart the linear travel distance 50. Consequently, upon overload, the two sensing elements 32, 34 make physical contact and thereby prevent any further force 54 from being directly loaded on the spacer 16. It is well known that a substantial overload to any elastomer or elastomeric spacer 16 will irreversibly damage or destroy it, and thus render the spacer 16 useless for force 54 measurement. The design illustrated in FIG. 3b, demonstrates that an overloading force 54 will simply be directed away from the spacer 16 after the deforming region has been utilized. More specifically, the overloading force 54 is transmitted through the platform structure 14, passing around the spacer 16, through the two sensing elements 32, 34 and finally through the base member 12. This off-load improves the reliability of the spacer 16 because it is saved from transient and prolonged abuse from overloading forces 54. The contact by the two sensing elements 32, 34 upon overload also generates an electrical short which can be detected by the resident circuit 42. This shorting event will signal the circuitry 42 that an overload of force 54 has occurred and that any noise or transient values generated are to be ignored or flagged. This will prevent the reporting of discordant data resulting from an overload of force 54 upon the platform structure 14.

In contemplated embodiments, the sensing mechanism may be any electrical, electro-optical, or electro-magnetic component which directly relates applied force 54 to distance between sensing elements, or indirectly to signal produced. Preferably, the sensing mechanism is a variable capacitor wherein sensing elements 32, 34 are washer-shaped electrodes juxtaposed to each other. Capacitance measurements between electrodes 32 and 34 are enhanced by a high dielectric value. More specifically, the preferred embodiment uses air as the dielectric rather than an elastomer or some other substance. Accordingly, the spacer 16 serves only to linearize the relationship between applied force and deformation distance, as measured by change in capacitance. This increase in capacitance signal from using an air dielectric is critical to achieving higher sensitivity and resolution of force measurements.

When using capacitance as the sensing means, the two electrodes 32, 34 must be electrically insulated from their respective substrates, specifically the inside recess edge 36 of the platform structure 14, and the inside surface 13 of the base member 12. Electrical insulation can be achieved by either making the platform structure 14 and base member 12 out of electrically non-conductive materials, or by inserting a electrically non-conductive material or layer between the electrodes 32 and 34, and their respective substrates.

In an alternative embodiment, the sensing mechanism utilizes an electro-optical sensor system (not shown), where the movable sensing element 32 is a light emitting diode (LED), and the fixed sensing element 34 is a photodetector that would sense the approaching LED by measuring light intensity or some other light parameter well known in the art.

In another alternative embodiment, the sensing mechanism utilizes an electro-magnetic sensor system (not shown), where the movable sensing element 32 is a magnet, and the fixed sensing element 34 is an electro-magnetic detector that would sense the proximity of a magnet. It is well known in the art that the movable and fixed relationship location of the magnet or magnets, and detector could be reversed on sensing elements 32, 34.

While the sensing mechanism has been described in connection with electrical, electro-optical and electromagnetic means to generate a signal, one skilled in the art will appreciate that the sensing mechanism is not necessarily so limited and that other signal generation methods are possible and adaptable to this force sensing device 10.

In the preferred embodiment which utilizes a variable capacitor, the electrical circuit 42 is a typical oscillator circuit used to cause a frequency change such that the frequency change is inversely proportional to the capacitance change. This electrical circuit 42 does not require any additional circuitry to compensate for device non-linearity because of the unique linear deformation properties of the spacer 16. However, the electrical circuit 42 may have thermal compensation factors to correct for the effect of temperature upon the linear deformation properties of the spacer 16.

Figure 4:
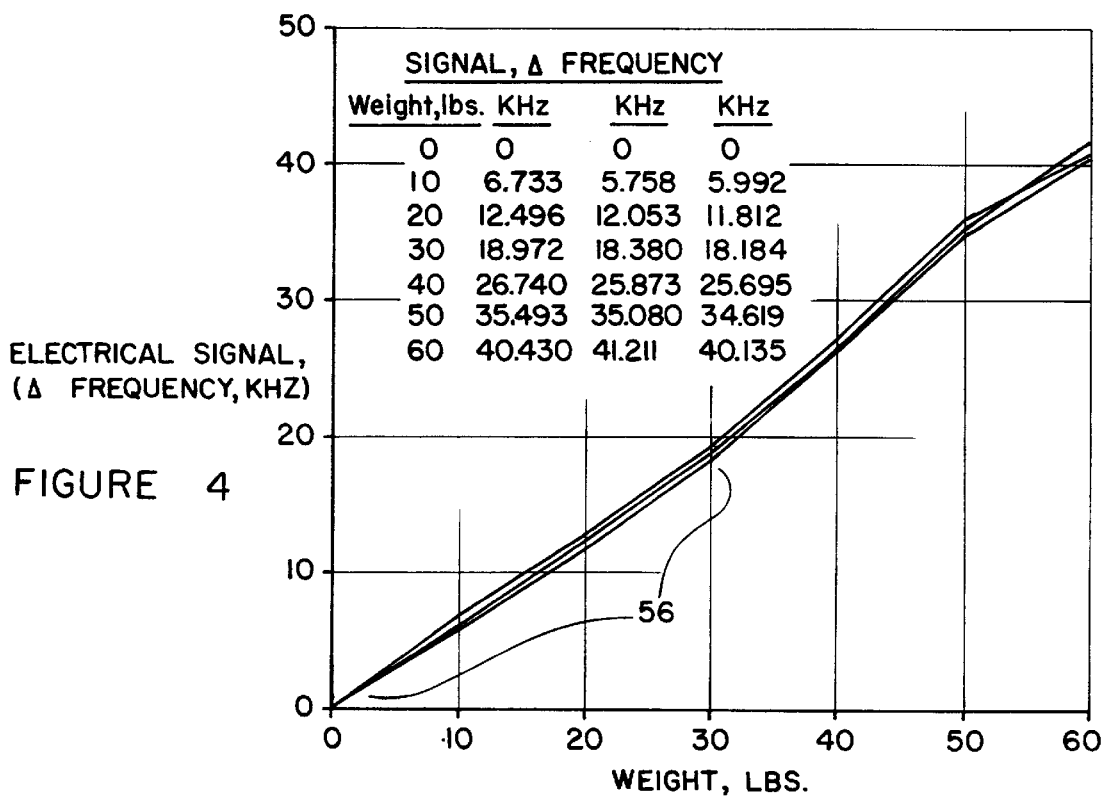
FIG. 4 is a data graph and an inset data table illustrating the region of linearity of electrical output resulting when force or weight is applied incrementally to the present invention.

Now referring to FIG. 4, a graph and inset data table illustrate the linear response when a series of six 10 pound weights were loaded onto the platform structure 14 of the present invention, and an electrical signal was measured as frequency change in units of KHz, from each of three tests of this preferred embodiment. From this graph, it is readily apparent that the most linear region 56 would be over the first 30 pound range of weights applied to the device. This linear region 56 can be extended for higher weight ranges, by increasing the amount of elastomer available for loading. This is accomplished by means well known in the art, such as by increasing the thickness of the spacer 16, changing the physical properties of the elastomer (i.e., changing tan δ, impact resilience, hardness, compression, or other viscoelastic properties), changing the form factor of the spacer 16, or by increasing the number of spacers 16 available for loading.

Figure 5:
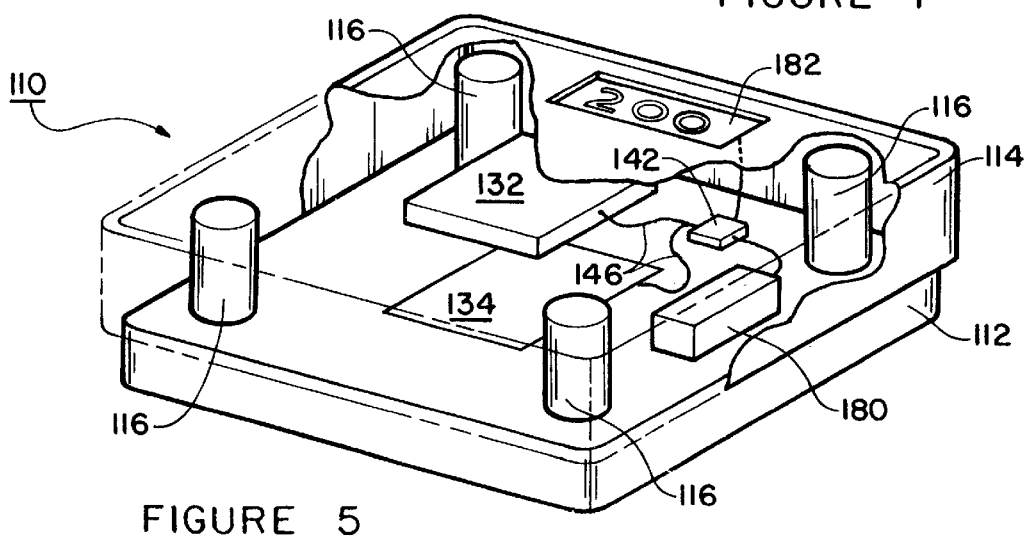
FIG. 5 is a cut-away perspective view of an alternative embodiment of the present invention used as a weight scale suitable for commercial markets.

FIG. 5 illustrates a commercial embodiment of this invention having similar inventive features. The weight scale 110 is structured from a plurality of elastomeric spacers 116, which again serve to linearize the relationship between force or weight and distance between sensing elements 132, 134. The sensing mechanism can once again be either electrical, electromagnetic, or electro-optical, or by other mechanisms well known in the art. In the preferred embodiment, the weight scale 110 uses a variable capacitor as the sensing mechanism. The platform structure 114 has a movable sensing element 132, such as an electrode, attached to the inside surface of the platform structure 114. The movable electrode 132 is electrically insulated from the platform structure 114, and other surrounding materials. This is accomplished by having the platform structure 114 made from plastic or other non-conductive material, or by at least placing a layer of a non-conductive material (not shown) between the movable electrode 132 and the platform structure 114. The fixed sensing element 134 is attached to and insulated from the inside surface of the base member 112, by similar means. The movable and fixed sensing electrodes 132, 134 are connected to an electrical circuit 142 which contain the common oscillator circuit described above. Upon applying force or weight to the platform structure 114, the movable sensing electrode 132 moves closer to the fixed sensing electrode 134, in the same linear manner as described for the preferred embodiment described in FIGS. 2 and 3. This movement causes a change in capacitance, that is detected by the electronic circuitry 142 powered by an electrical power source 180, such as a battery. This circuitry 142 converts the oscillations into factory predetermined units of force or weight in pounds, and then transmits the resulting measurements through the electrical wiring 146 to an electrically powered display 182.

While the invention has been described in connection with preferred, alternative and commercial embodiments, it will be understood that it is not intended to limit the invention thereto, but it is intended to cover all modifications and alternative constructions falling within the spirit and scope of the invention as expressed in the appended claims.

I claim:

1. A capacitive force sensing device comprising:

a base member;

a platform structure moveable relative to said base member in response to a force applied to said platform structure;

a spacer positioned between said platform structure and said base member, said spacer having a spring constant which is substantially linear with respect to the amount of force applied over a deformable region of said spacer, said region being defined as the linear travel distance of said spacer;

a variable capacitor having a first electrode affixed to said platform structure and a second electrode affixed to said base member, said first electrode and said second electrode having a maximum distance of separation equal to said linear travel distance, and said capacitor configured to provide a change of capacitance upon movement of said platform structure relative to said base member; and an electrical means for said variable capacitor, said electrical means configured to sense a changed capacitance in said variable capacitor and to provide an electrical output in response to the changed capacitance.

2. A force sensing device as recited in claim 1, wherein the dielectric of said capacitor is air.

3. A force sensing device as recited in claim 1, wherein said spacer is formed of polyurethane.

4. A force sensing device as recited in claim 1, wherein said spacer is perforated.

5. A force sensing device as recited in claim 4, further comprising a rod extending through said perforation for securing said spacer between said base member and platform structure.

6. A force sensing device as recited in claim 1, wherein said electrical means is an oscillator circuit.

7. A force sensing device as recited in claim 1, wherein said spacer has a spring constant which is substantially infinite with respect to the amount of force applied over a predetermined region of said spacer, said region being defined as the non-deformable distance.

8. A force sensing device as recited in claim 7, wherein said platform structure has a cavity formed therein for receiving a portion of said spacer equal to said non-deformable distance of said spacer.

9. A force sensing device as recited in claim 7, wherein said base member has a cavity formed therein for receiving a portion of said spacer equal to said non-deformable distance of said spacer.

10. A force sensing device as recited in claim 1, wherein said linear travel distance ranges between twenty to thirty percent of the total distance of said spacer.

11. A force sensing device as recited in claim 1, wherein said linear travel distance is the initial twenty to thirty percent of the total distance of said spacer.

12. A force sensing device comprising:

a base member;

a platform structure moveable relative to said base member in response to a force applied to said platform structure;

a spring positioned between said platform structure and said base member, said spring having a spring constant which is substantially linear with respect to the amount of force applied over a predetermined region of travel, said region being defined as the linear travel distance of said spring; and a sensing means having a movable portion thereof affixed to said platform structure and a fixed portion thereof affixed to said base member, wherein said movable portion and said fixed portion having a maximum distance of separation equal to said linear travel distance, said sensing means configured to provide a measurement of the relative distance between said portions.

13. A force sensing device as recited in claim 12, wherein said spring is formed of plastic.

14. A force sensing device as recited in claim 13, wherein said spring is formed of polyurethane.

15. A force sensing device as recited in claim 12, wherein said sensing means utilizes components for producing and detecting the strength of a magnetic field.

16. A force sensing device as recited in claim 12, wherein said sensing means utilizes a variable capacitor.

17. A force sensing device as recited in claim 12, wherein said sensing means utilizes a means for producing and detecting the strength of a light source.

18. A force sensing device as recited in claim 12, further comprising an electrical means connected to said sensing means, said electrical means configured to measure the distance between said portions and to provide an electrical output in response to the changed distance.

19. A weight scale comprising:

a base member;

a platform structure moveable relative to said base member in response to a weight placed on said platform structure;

a plurality of spacers positioned between said platform structure and said base member, said spacers having a common spring constant which is substantially linear with respect to the amount of weight applied over a predetermined region of travel, said region being defined as the linear travel distance of said spacers;

a variable capacitor having a first electrode affixed to said platform structure and a second electrode affixed to said base member, said first electrode and said second electrode having a maximum distance of separation equal to said linear travel distance, and said capacitor configured to provide a change of capacitance upon movement of said platform structure relative to said base member; and an electrical means for said variable capacitor, said electrical means configured to sense a changed capacitance in said variable capacitor and to provide an electrical output in response to the changed capacitance.

20. A weight device as recited in claim 19, wherein said spacer is formed of polyurethane.

* * * * *